J. P. TARBOX
Feb. 28, 1933. AUTOMOBILE CHASSIS OF SHEET METAL STAMPINGS Re. 18,750
Original Filed Dec. 21, 1927 3 Sheets-Sheet 1
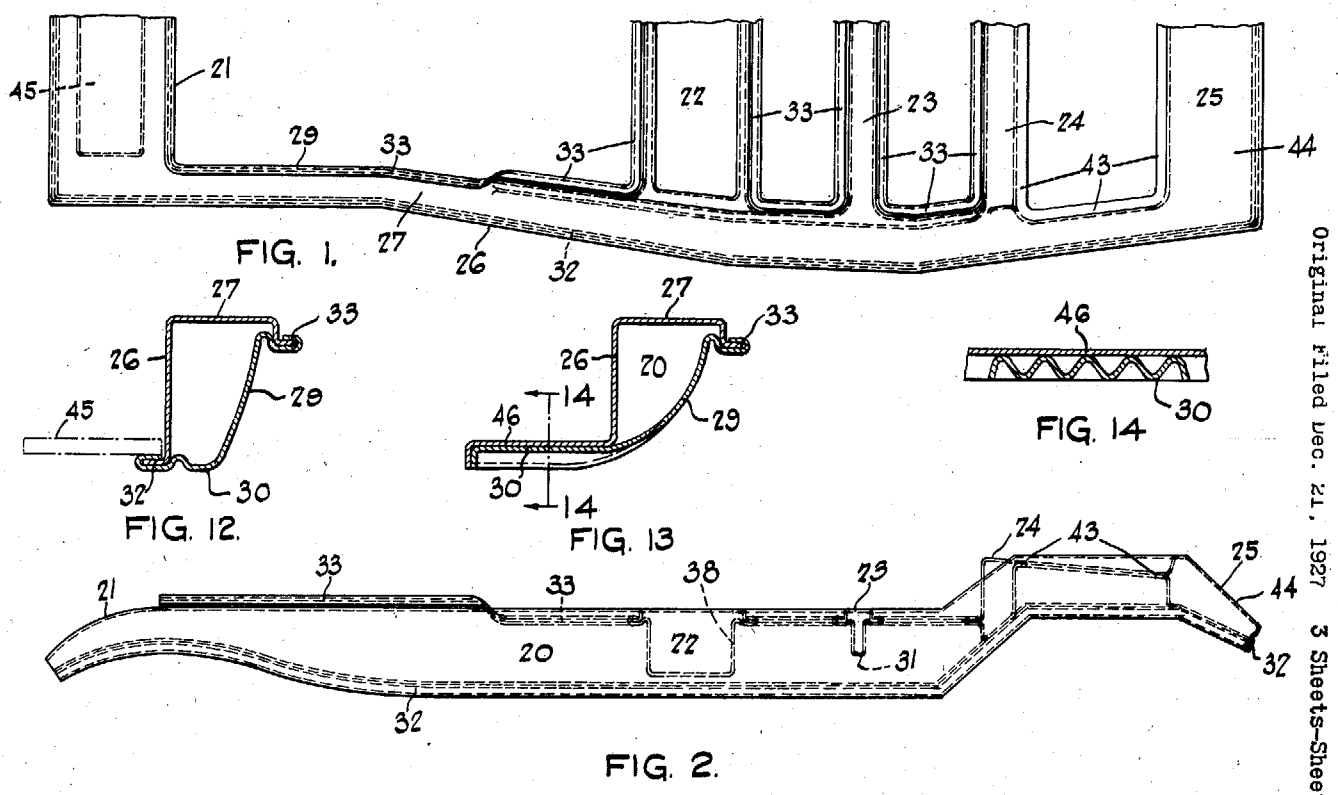
INVENTOR.
J. P. Tarbox J. P. TARBOX
Feb. 28, 1933. AUTOMOBILE CHASSIS OF SHEET METAL STAMPINGS Re. 18,750
Original Filed Dec. 21, 1927 3 Sheets-Sheet 2
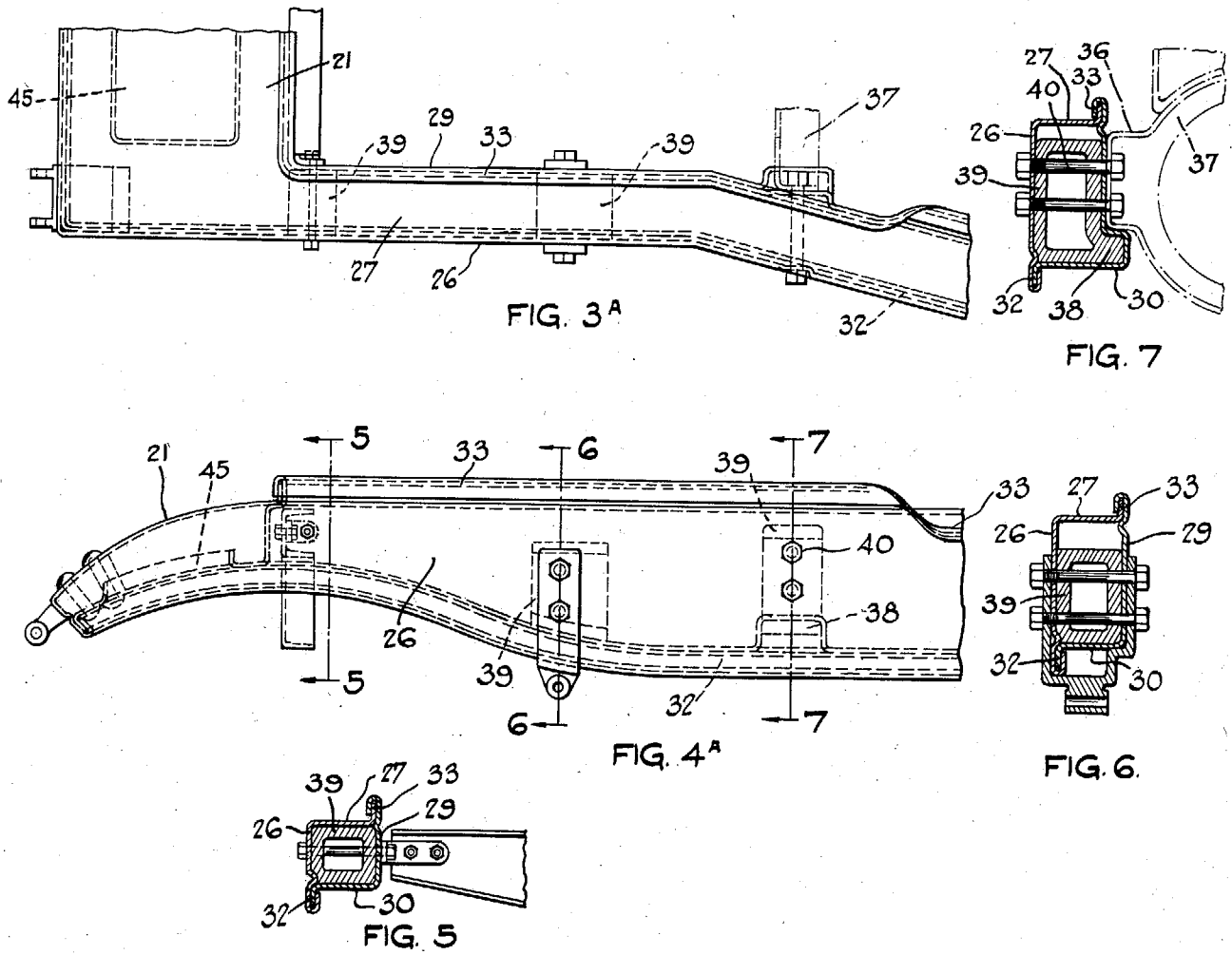
INVENTOR.
J. Ph. Tarbox J. P. TARBOX
Feb. 28, 1933. AUTOMOBILE CHASSIS OF SHEET METAL STAMPINGS Re. 18,750
Original Filed Dec. 21, 1927 3 Sheets-Sheet 3
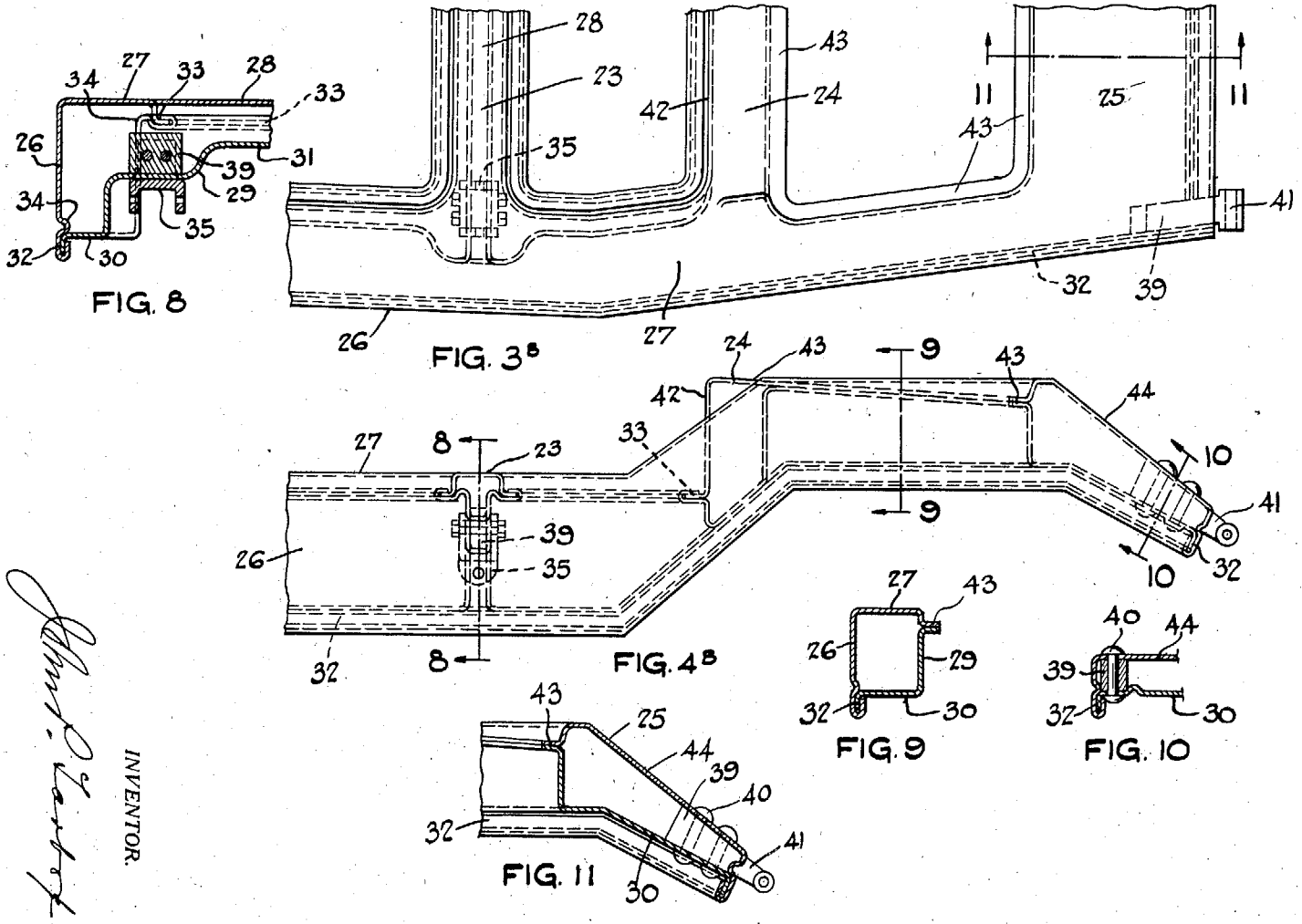
INVENTOR.
J. P. Tarbox Reissued Feb. 28, 1933

Re. 18,750

UNITED STATES PATENT OFFICE

JOHN P. TARBOX, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

AUTOMOBILE CHASSIS OF SHEET METAL STAMPINGS

Original No. 1,737,810, dated December 3, 1929, Serial No. 241,685, filed December 21, 1927. Application for reissue filed December 2, 1931. Serial No. 578,567.

The outstanding object of my invention is the attainment in an automobile chassis of those degrees of lightness, stiffness, freedom from joints and high economy in production which the use of relatively thin and expansive sheet metal stampings have secured to the automobile body. In other words, it has been my aim to so construct an automobile chassis of relatively thin sheet metal stampings that these advantages will be secured.

Heretofore it has many times been proposed to construct an automobile chassis of a single sheet metal stamping. To attain this it has been proposed to vertically draw a sheet of metal sufficiently large to produce a complete chassis in such manner as to form therefrom in a single drawing operation chassis sills and cross braces, drip pans, floors, splash boards, running boards and fenders. Sometimes the proposal covered some of these elements and sometimes all of them. But such constructions are at large subject to the objections that unless the gauge of the metal be extremely heavy, not merely relatively heavy, strength and stiffness could not be secured since the relative inter-bracing of the parts is otherwise insufficient. Yet if the gauge be made sufficiently heavy to attain these two advantages, the other two, lightness of construction and economy of production were unduly defeated. Indeed, in many constructions it would be impossible to draw the metal were its gauge made sufficient to meet the requirements.

Accordingly, I have made it also an object of my invention to attain such disposition of the relatively thin sheet metal, and such disposition of the joints thereof as would insure strength and stiffness and rigidity amply sufficient for all purposes without in any instance sacrificing the lightness and economy of production.

Stated in general terms, my construction comprises a chassis of structural form, the various structural members of which, as for example, the chassis side sills and cross braces, are of hollow cross section and are comprised in entirety of two sheet metal stampings, an upper sheet metal stamping constituting outer and upper portions of the member, and a lower sheet metal stamping constituting the inner and lower portions of the member, which sheet metal stampings are joined together in their margins.

In the drawings I show the best embodiment of my invention now known to me but it is obviously capable of other embodiments both in part and in parcel without departing from its generic spirit.

Of the drawings,—

Figure 1 is a general plan view of the left side of the chassis.

Figure 2 is a corresponding left side elevation.

Figures 3—A and 3—B are enlargements of the front and rear ends of the plan view of Figure 1.

Figures 4—A and 4—B are respectively corresponding enlargements of the left side elevation thereof.

Figures 5, 6, 7, 8, 9, 10 and 11 are respectively cross sections on lines of corresponding number in the directions of the applied arrows in Figs. 1 to 4—B.

Figures 12 and 13 are cross sections showing each a modified form of the chassis side sill, the sections being transverse sections of the sill.

Figure 14 is a section taken on line 14—14 of Fig. 13.

The structural form of the chassis in elevation and plan is in outline and in position of members essentially similar to the structural form of the standard automobile chassis of today. While similar, however, it does differ from it in a number of respects which will be clearly apparent. Its similarity is principally in the use of longitudinally extending side sills 20 and transversely extending cross braces 21 to 25. Its structural dissimilarities are principally in the forms of these sills and cross braces. The construction of these structural members, however, is wholly dissimilar.

Substantially throughout the chassis the structural members are of generally hollow box construction as appears clearly from the sections of Figs. 5 to 14. Throughout they are comprised of relatively thin, light, sheet metal stampings, only a fraction of the gauge ordinarily employed in the structural sill members of a chassis, of a gauge approaching in thinness, if not actually reaching in thinness, the gauge employed in the outer panel of sheet metal bodies and in the relatively thin frame members thereof.

The entire outer and upper walls of the sills 26 and 27, respectively, together with the entire upper walls designated 28 of the cross braces, are formed in common as a stamping from a single sheet of relatively light gauge sheet metal. The entire inner and lower walls 29, 30 of the chassis side walls and of the cross braces designated 31 are constituted in common of an integral one piece stamping of relatively thin gauge sheet metal. These two integral one piece stampings are joined together in their generally flanged margins to constitute the chassis. The joining is by crimping the meeting flanged edges of the parts of the hollow sections, thereby forming reinforced shoulders projecting outwardly of the generally hollow form parts. Thus, the parts of the sill are crimped together at 32 and 33, the lower outer margins and the upper inner margins, the respective stampings therefor forming the adjacent sides of the box section.

The crimped joints 32 and 33 may be of any well known form. That one shown embodies in the stampings the locking shoulders 34. The crimped joint 33 is offset downwardly to form a shoulder for a floor board support. This offset is in the same plane with the crimped joints 33 of the cross braces, whereby the cross braces also afford a floor board support. The upper surfaces 28 of these cross braces lie in the same plane as the top of the flooring and therefore constitute a part thereof. Through this disposition of the crimped joints there may be continuous crimping both of the outer margins of the stampings as at 32 and of the inner margins bordering the openings between the cross braces as at 33. Thereby the crimping operations may each be carried out in a single press.

The inner side walls 29 are inwardly offset for various purposes as shown in Fig. 8 for the provision of a longitudinal anchorage 35 for longitudinally extending spring, or as in Fig. 7 to provide for the transverse anchorage 36 of the motor support 37, or in other ways as in Figs. 1 and 2 to provide a battery box 38. The transverse offset illustrated in Fig. 7 for the engine support is also transversely shouldered as at 38 to vertically seat and support the motor support 37. The spring support 35 shown in Fig. 8 extends transversely quite a distance underlying the cross brace 23 and forming a part of the underwall 31 thereof. The offset 38 of Figs. 1 and 2 is extended both transversely and longitudinally and is open at the top whereby the battery or other parts stored therein may be easily inserted and removed. Obviously, offsets for these and similar purposes may be most readily provided by stamping in the inner walls 29 of the side sills and the under walls 31 of the cross braces.

In the regions of these offsets the opposite side walls of the chassis side sills and the cross braces respectively are inter-braced as by transversely extending castings 39 of appropriate form and shape to transversely brace the relatively thin sheet metal walls the better to receive the strains of the anchorage as applied by through bolts 40 or their equivalent devices. Such inter-bracing means at the opposite ends of the sills constitute in themselves supports for anchorages 41 for the front and rear spring shackles.

The one piece upper stamping has formed therein as part of the cross brace 24 integrally connected heel board 42 and seat support 43, also integrally formed tank cover plate 44 and seat support 43.

In the modification shown in Fig. 12, the lower crimped joint 32 is outturned instead of downward to form the support for the inner edge of the footboard 45 shown in dotted lines.

In the modification shown in Figs. 13–14, the footboard 46 is formed integrally with the outer and inner walls 26 and 29 of the chassis side sill 20. The outer wall 26 is turned outwardly and downwardly to constitute the upper surface of footboard 46. The inner side wall 29 is turned outwardly and transversely corrugated as shown in Fig. 14. It is welded to the outer wall in the corrugations.

Many other modifications may be mentioned, the cutting out of the metal in certain of the cross brace formations to lighten the same, as for example, at 45 in Fig. 4—A, the under side of the front cross brace 21 where the metal is flanged upwardly on the margins of the opening. The upper wall of cross brace 21 constitutes the front cover plate of the chassis sills and cross brace. Drip pans may be formed integrally with either the upper or the lower of the two stampings. None are shown since the manner of their formation of one piece stamping is well known in the art. The joints between the stamping, while best formed by crimping as shown, may be formed in other ways as for example, as welded lap joints or joints of other construction and making. Welded joints are shown between certain of the margins as for example, those between the upper and lower walls of cross braces 24 and 25 constituting the seat support 43. Others of greater and of less extent can be readily made by those skilled in the art but in all of them the objects of my invention will have been achieved and the advantages thereof secured.

What I claim as new and useful is:

1. An automobile chassis of hollow cross section comprised of upper and lower sheet metal stampings constituting its upper and lower surfaces and joined together in their margins.

2. An automobile chassis of structural form and hollow cross section, the various structural members of which have their upper surfaces formed in common of one sheet metal stamping and their lower surfaces formed in common of a second sheet metal stamping and their stampings joined together in their margins.

3. An automobile chassis comprising side sills and cross braces of hollow cross section and the side sills being of box cross section, the upper surfaces of which members are formed in common of one sheet metal stamping and the lower surfaces of which member are formed in common of another sheet metal stamping.

4. An automobile chassis embodying a chassis side sill of box cross section comprised of two longitudinally extending sheet metal stampings constituting respectively adjacent side walls of the box cross section and crimped together in diagonal opposite corners of the sill.

5. An automobile chassis embodying a chassis side sill of box cross section, two adjacent sides of which are constituted in common of one sheet metal stamping and the two remaining sides of which are constituted in common by another sheet metal stamping, the upper of said joints being downwardly offset to provide a floor board supporting shoulder.

6. An automobile chassis embodying chassis side sills of relatively thin sheet metal stampings and box cross section, the inner side walls of which box section are inwardly offset to serve as portions of transversely extending cross braces.

7. An automobile chassis embodying chassis side sills of relatively thin sheet metal stampings and box cross section, the inner side walls of which are inwardly offset and transversely shouldered to serve as portions of transversely extending cross braces.

8. An automobile chassis embodying chassis side sills of relatively thin sheet metal stampings and box cross section, the inner side wall of which is provided with integral transversely extending offsets carrying longitudinal anchorages for longitudinally extending springs.

9. An automobile chassis embodying chassis side sills of relatively thin sheet metal stampings and box cross section, the inner side wall of which is provided with an integral transversely and longitudinally extending portion downwardly offset as respects the top of the sills and open at the top to serve as storage space for batteries and the like.

10. An automobile chassis comprising side sills and cross braces of hollow cross section and the side sills being of box cross section, the upper surfaces of which members are formed in common of one sheet metal stamping and the lower surfaces of which members are formed in common of another sheet metal stamping, the outer and upper sill and upper cross brace walls constitute the one stamping and the inner and lower sill walls and the under cross brace walls being constituted by the other stamping.

11. An automobile chassis of hollow cross section comprised of upper and lower sheet metal stampings constituting its upper and lower surfaces and joined together in their margins, the upper stamping embodying integrally a connected heel board and seat support.

12. An automobile chassis of hollow cross section comprised of upper and lower sheet metal stampings constituting its upper and lower surfaces and joined together in their margins, the upper stamping embodying integrally a rear anchorage board and a seat support.

13. An automobile chassis embodying a side sill of generally box cross section fabricated out of a plurality of sheet metal stampings, at least one of said stampings being flanged inwardly to form a floor supporting ledge projecting laterally from the box section portion of the sill between the upper and lower portions of the sill.

14. An automobile chassis embodying a side sill of generally box section form fabricated out of a plurality of sheet metal stampings, at least one of said stampings extending through two adjacent angularly related sides of the sill and joined in its edges through flanges thereon projecting out from the box section portion of the sill to the remaining stamping or stampings of the sill at least one of said edges thus joined extending outwardly from the sill between the upper and lower portions of the sill.

15. An automobile chassis embodying a side sill of generally box section form fabricated out of a plurality of sheet metal stampings. said stampings being joined together through edge flanges thereon projecting outwardly from the general box section form of the sill between the upper and lower portions of the sill.

16. An automobile chassis embodying a side sill of generally box section form fabricated out of a plurality of sheet metal stampings, said stampings being joined together through edge flanges thereon crimped one over the other and projecting outwardly from the general box section form of the sill in various directions at least one of said flanges forming a shoulder between the upper and lower surfaces of the sill.

In witness whereof I hereby affix my signature.

JOHN P. TARBOX.